(12) United States Patent
Russ et al.

(10) Patent No.: US 12,715,702 B2
(45) Date of Patent: Aug. 25, 2026

(54) CONVEYOR SYSTEM

(71) Applicant: Intelligrated Headquarters, LLC, Mason, OH (US)

(72) Inventors: Benjamin Russ, Cincinnati, OH (US); Jarl Sebastian, Mason, OH (US); Justin Brouk, Cincinnati, OH (US)

(73) Assignee: Intelligrated Headquarters, LLC, Mason, OH (US)

(*) Notice: Subject to any disclaimer, the term of this patent is extended or adjusted under 35 U.S.C. 154(b) by 105 days.

(21) Appl. No.: 18/737,556

(22) Filed: Jun. 7, 2024

(65) Prior Publication Data

US 2025/0376332 A1 Dec. 11, 2025

(51) Int. Cl.

| | |
|---|---|
| ***B65G 21/06*** | (2006.01) |
| ***B65G 21/10*** | (2006.01) |
| ***B65G 23/44*** | (2006.01) |

(52) U.S. Cl.
CPC ........... *B65G 21/105* (2013.01); *B65G 23/44* (2013.01)

(58) Field of Classification Search
CPC ............................ B28B 13/027; B65G 21/105
USPC .......................................................... 198/813
See application file for complete search history.

(56) References Cited

U.S. PATENT DOCUMENTS 6,170,645 B1 1/2001 Mitchell
7,806,254 B2 * 10/2010 Brayman ............... B65G 21/06 198/833
8,925,718 B2 1/2015 Miles et al.
10,065,659 B2 9/2018 Andreetto
10,160,607 B2 * 12/2018 Danelski ................ B65G 43/10
(Continued)

FOREIGN PATENT DOCUMENTS

| | | |
|---|---|---|
| CN | 105905532 A | 8/2016 |
| CN | 208897988 U | 5/2019 |
| CN | 212892228 U | 4/2021 |

(Continued)

OTHER PUBLICATIONS

Damon Group, "Cross-belt Sorter", retrieved from the Internet at http://www.damon-group.com/intelligent-sorting-system-15 on Feb. 12, 2025, 4 pages.

(Continued)

*Primary Examiner* — Gene O Crawford
*Assistant Examiner* — Amari J Meddling
(74) *Attorney, Agent, or Firm* — Alston & Bird LLP

(57) ABSTRACT

A conveyor system is disclosed. The conveyor system comprising, a conveyor frame and a plurality of detachable conveyor sections. Further, the conveyor frame has a plurality of zones and a pair of longitudinal side rails extending through at least one of the plurality of zones. Further, each zone of the conveyor frame is associated with a distinct detachable conveyor section of the plurality of detachable conveyor sections and includes a power transmission assembly. Further, each detachable conveyor section is detachably mounted to the pair of longitudinal side rails via a plurality of fasteners and includes a conveyor section drive pulley. Further, the power transmission assembly includes a conveyor frame drive pulley, an idler pulley, a tensioner, and a drive belt. Further, the tensioner of each power transmission assembly is configured to release tension of an associated drive belt for detaching an associated detachable conveyor section from the conveyor frame.

18 Claims, 14 Drawing Sheets

(56) References Cited

U.S. PATENT DOCUMENTS

| | | | | |
|---|---|---|---|---|
| 10,370,192 | B2 | 8/2019 | Schmidt et al. | |
| 2021/0078795 | A1 * | 3/2021 | Poikonen ............... | B65D 90/66 |

FOREIGN PATENT DOCUMENTS

| | | | | | |
|---|---|---|---|---|---|
| EP | 3508443 | A1 | | 7/2019 | |
| TW | 1852140 | B | * | 8/2024 | ....... C23C 16/45544 |

OTHER PUBLICATIONS

Extended European Search Report Mailed on Oct. 21, 2025 for EP Application No. 25175660, 7 page(s).

* cited by examiner

PLACE A CONVEYOR SECTION OF A PLURALITY OF DETACHABLE CONVEYOR SECTIONS OVER A CONVEYOR FRAME HAVING A PLURALITY OF ZONES AND A PAIR OF LONGITUDINAL SIDE RAILS EXTENDING THROUGH TWO OR MORE OF THE PLURALITY OF ZONES — 1202

MOUNT, VIA A PLURALITY OF FASTENERS, EACH DETACHABLE CONVEYOR SECTION TO THE PAIR OF LONGITUDINAL SIDE RAILS — 1204

CONVEYOR SYSTEM

TECHNOLOGICAL FIELD

Example embodiments of the present disclosure relate generally to a conveyor system, and more particularly relates to a conveyor system and a method thereof.

BACKGROUND

Conveyor systems are an integral component of many industries, facilitating an automated movement of goods from one end to another. One crucial aspect of the conveyor systems is smooth transportation of one or more objects from a source to a destination. However, routine maintenance and repairs often leads to a temporary disconnection of conveyor peripherals. Conventionally, the conveyor systems comprise a complex network of components and the conveyor peripherals. Further, the disconnection of such components and the conveyor peripherals demands an ample amount of time and manpower. Furthermore, to minimize downtime and enhance operational efficiency, there's a fundamental requirement for easy coupling and decoupling mechanisms for the conveyor peripherals. Such mechanisms can facilitate an easy disassembly and reassembly of conveyor sections, enabling maintenance personnel to efficiently address reduces downtime but also ensures the longevity and reliability of the conveyor systems.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of concepts the present disclosure. This summary is not an extensive overview and is intended to neither identify key or critical elements nor delineate the scope of such elements. Its purpose is to present some of the described features in a simplified form as a prelude to the more detailed description that is presented later.

In one example embodiment, a conveyor system is disclosed. The conveyor system comprising, a conveyor frame and a plurality of detachable conveyor sections. Further, the conveyor frame has a plurality of zones and a pair of longitudinal side rails extending through at least one of the plurality of zones. Further, each zone of the conveyor frame is associated with a distinct detachable conveyor section of the plurality of detachable conveyor sections and includes a power transmission assembly. Further, each detachable conveyor section is detachably mounted to the pair of longitudinal side rails via a plurality of fasteners and includes a conveyor section drive pulley. Further, the power transmission assembly for each detachable conveyor section includes a conveyor frame drive pulley, an idler pulley, a tensioner, and a drive belt around the conveyor frame drive pulley, the idler pulley, the tensioner, and the conveyor section drive pulley of an associated detachable conveyor section. Further, the tensioner of each power transmission assembly is configured to release tension of an associated drive belt for detaching the associated detachable conveyor section from the conveyor frame.

In some embodiments, the conveyor system further comprising a first set of apertures on each longitudinal side rail of the pair of longitudinal side rails and a first cavity at one of the pair of longitudinal side rails.

In some embodiments, each of the plurality of detachable conveyor sections further comprises a pair of longitudinal side frames for each zone. Further, the pair of longitudinal side frames comprise a second set of apertures fabricated on each longitudinal side frame of the pair of longitudinal side frames, a second cavity fabricated at one of the pair of longitudinal side frames. Further, the pair of longitudinal side frames is detachably coupled over the pair of longitudinal side rails with the first set of apertures aligned with the second set of apertures via the plurality of fasteners.

In some embodiments, the tensioner is configured to maintain a predefined tension of the drive belt wrapped around the conveyor frame drive pulley, the idler pulley, the tensioner, and the conveyor section drive pulley of the associated detachable conveyor section. In some embodiments, the conveyor frame is rigidly mounted over a plurality of load supporting members.

In some embodiments, each of the plurality of detachable conveyor sections further comprises at least one conveyor belt. Further, one end of the at least one conveyor belt is coupled with the conveyor section drive pulley and other end of the at least one conveyor belt is coupled to an idler roller.

In some embodiments, the pair of longitudinal side rails further comprises at least one stud. Further, the at least one stud is configured to hold the drive belt when each of the plurality of detachable conveyor sections is detached from the pair of longitudinal side rails. In some embodiments, the plurality of fasteners are released from the pair of longitudinal side rails and the pair of longitudinal side frames, to detach each of the pair of detachable conveyor sections from the pair of longitudinal side rails. In some embodiments, upon detaching each of the plurality of detachable conveyor sections from the pair of longitudinal side rails, each of the plurality of detachable conveyor sections are configured to be removed by lifting and sliding each of the plurality of detachable conveyor sections.

In some embodiments, the tensioner comprises at least one lever. Further, the at least one lever is rotated in at least one direction to release a predefined tension over the drive belt and decouple each of the plurality of detachable conveyor sections from the pair of longitudinal side rails.

In some embodiments, the pair of longitudinal side frames further comprises a side cover. Further, the side cover is configured to cover the second set of apertures and the second cavity.

In some embodiments, the conveyor system further comprising at least one photo-eye sensor mounted on the pair of longitudinal side frames of each of the plurality of detachable conveyer sections. Further, the at least one photo-eye sensor is configured to detect presence and precise positioning of one or more objects placed over each of the plurality of detachable conveyer sections.

In another example embodiment, a method is disclosed. The method comprising steps of placing a conveyor section of a plurality of detachable conveyor sections over a conveyor frame having a plurality of zones and a pair of longitudinal side rails extending through at least one of the plurality of zones. Further, each zone of the conveyor frame is associated with a distinct detachable conveyor section of the plurality of detachable conveyor sections and includes a power transmission assembly. The method further comprises steps of mounting, via a plurality of fasteners, each detachable conveyor section to the pair of longitudinal side rails. Further, each detachable conveyor section includes a conveyor section drive pulley. Further, the power transmission assembly for each detachable conveyor section includes a conveyor frame drive pulley, an idler pulley, a tensioner, and a drive belt around the conveyor frame drive pulley, the idler pulley, the tensioner, and the conveyor section drive pulley of an associated detachable conveyor section. Further, the tensioner of each power transmission assembly is configured to release tension of an associated drive belt for detaching the associated detachable conveyor section from the conveyor frame.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Figure 1A:
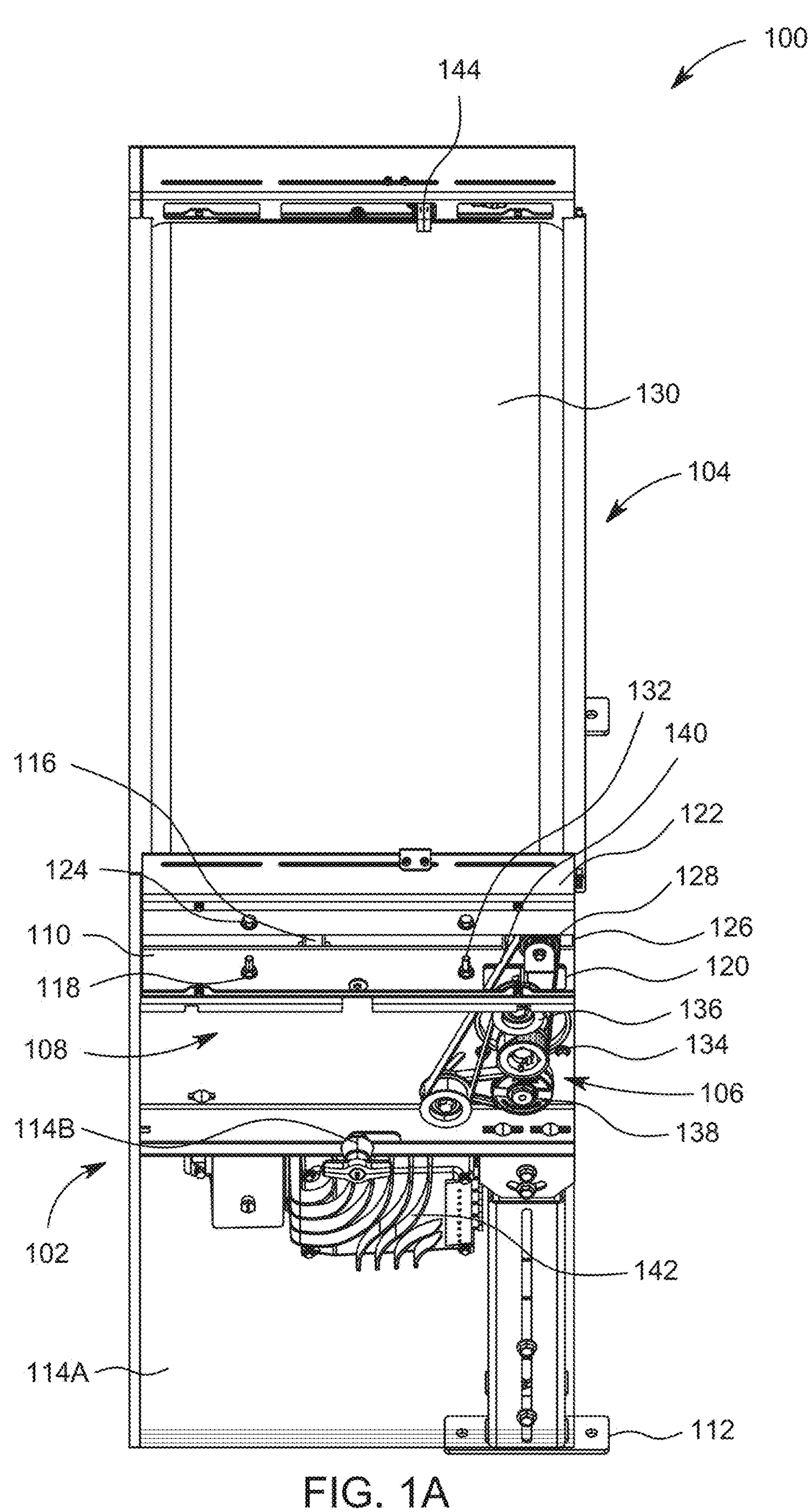
Figure 1B:
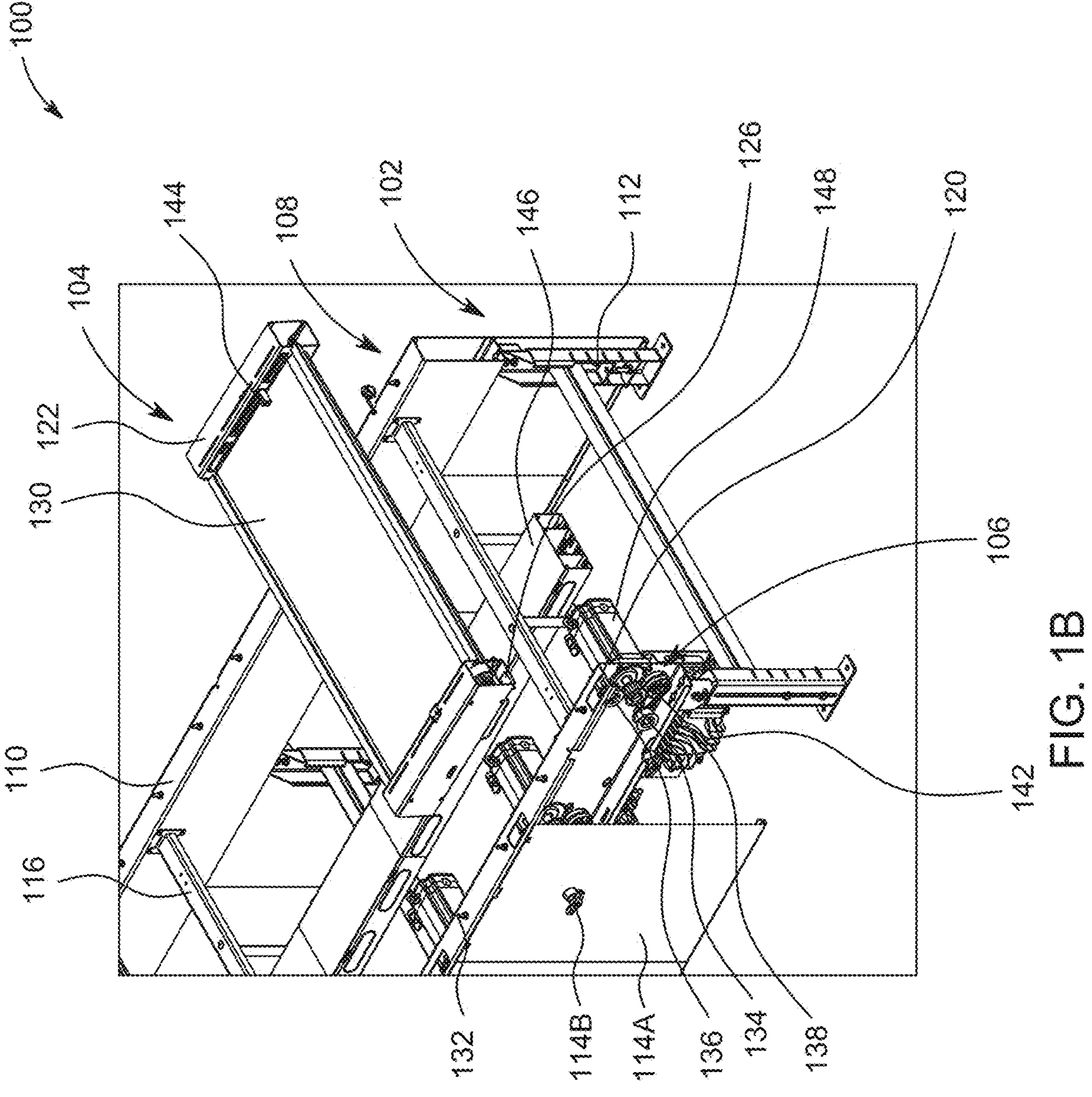
Figure 2:
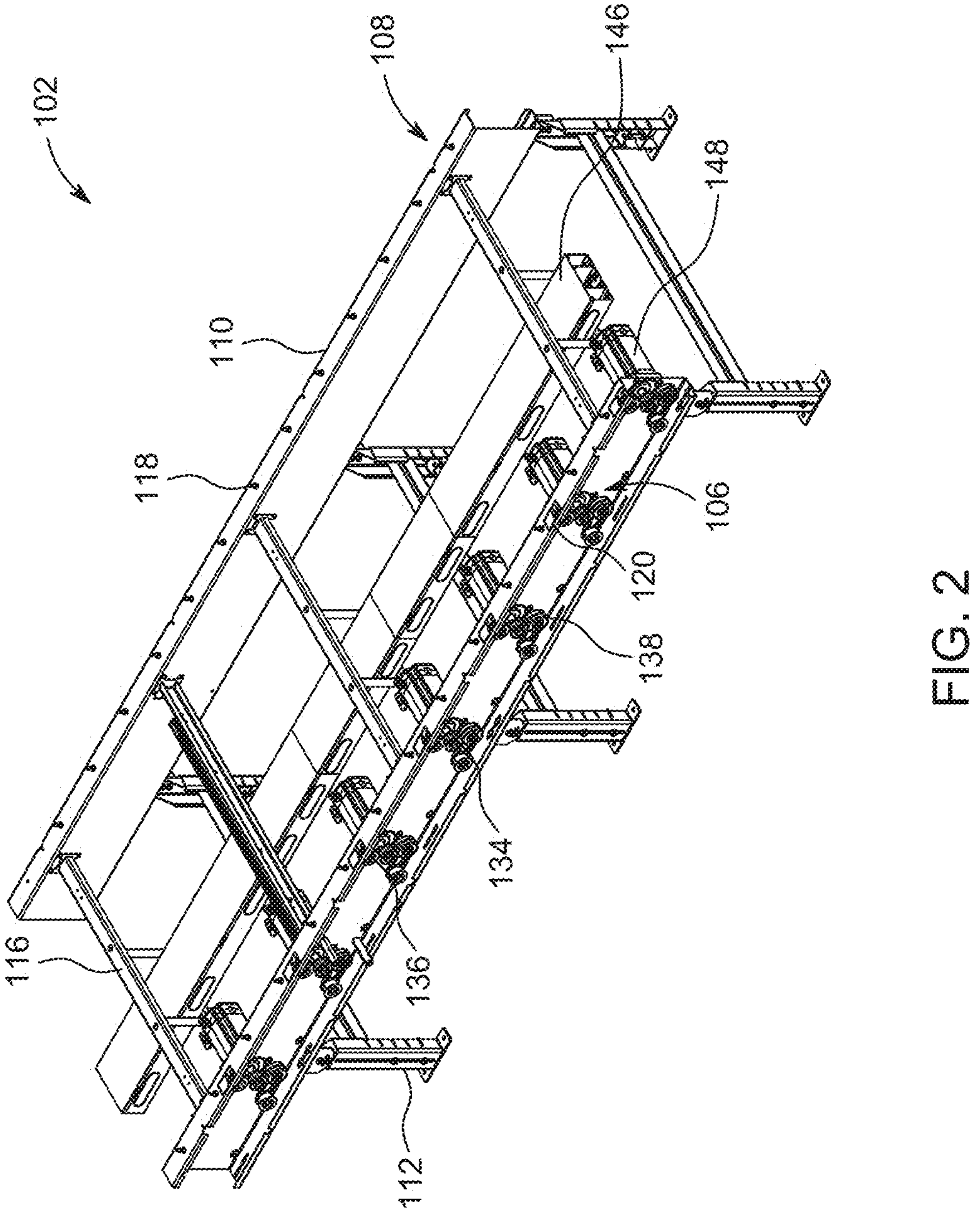
Figure 3:
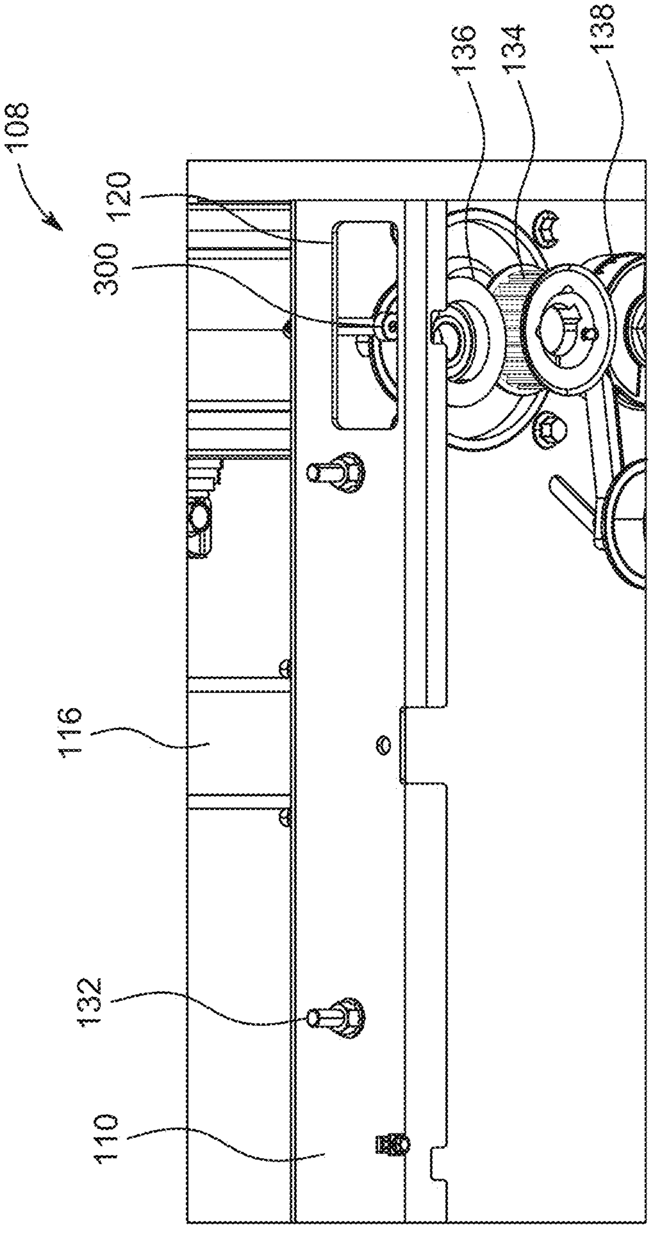
Figure 4:
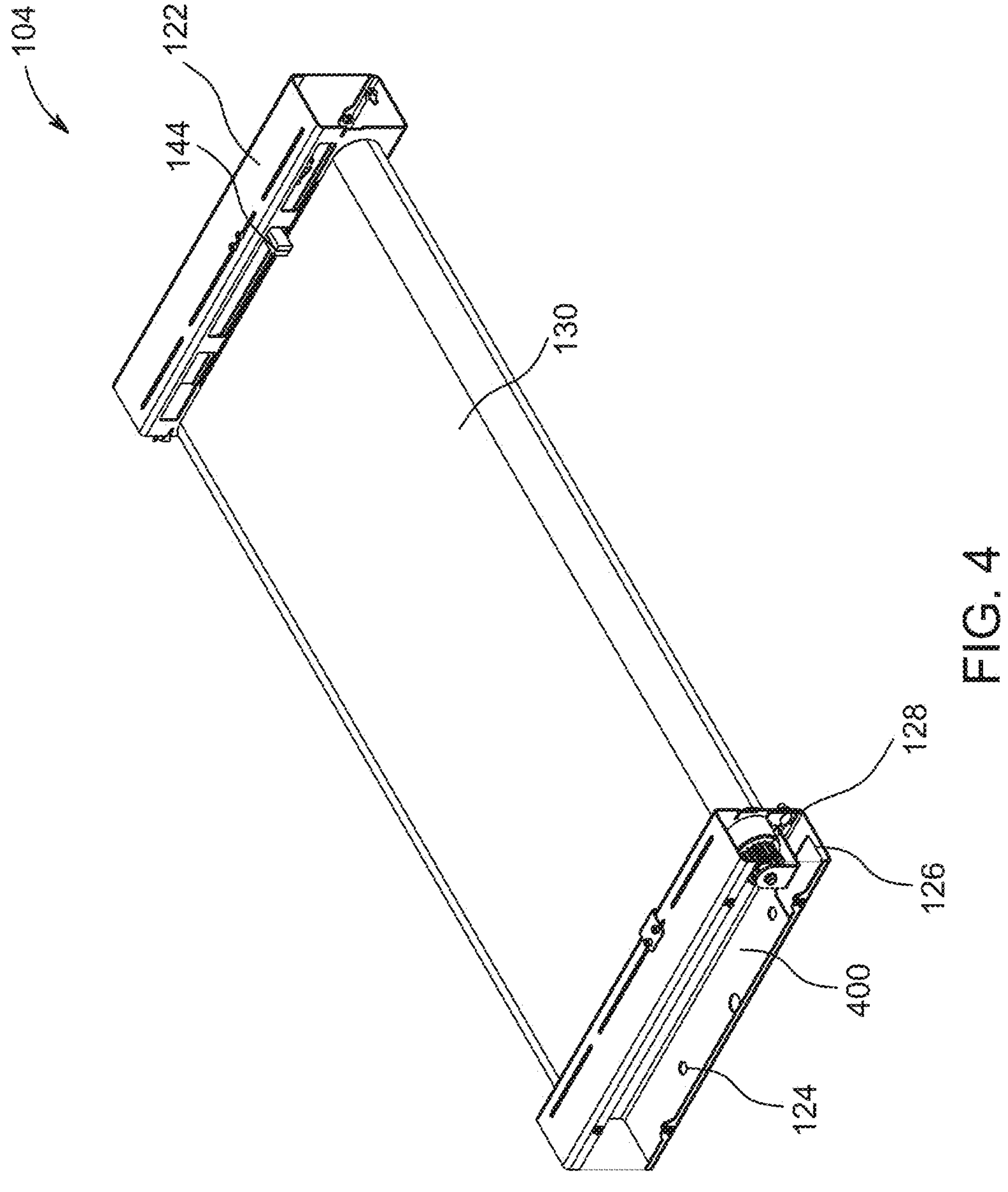
Figure 5:
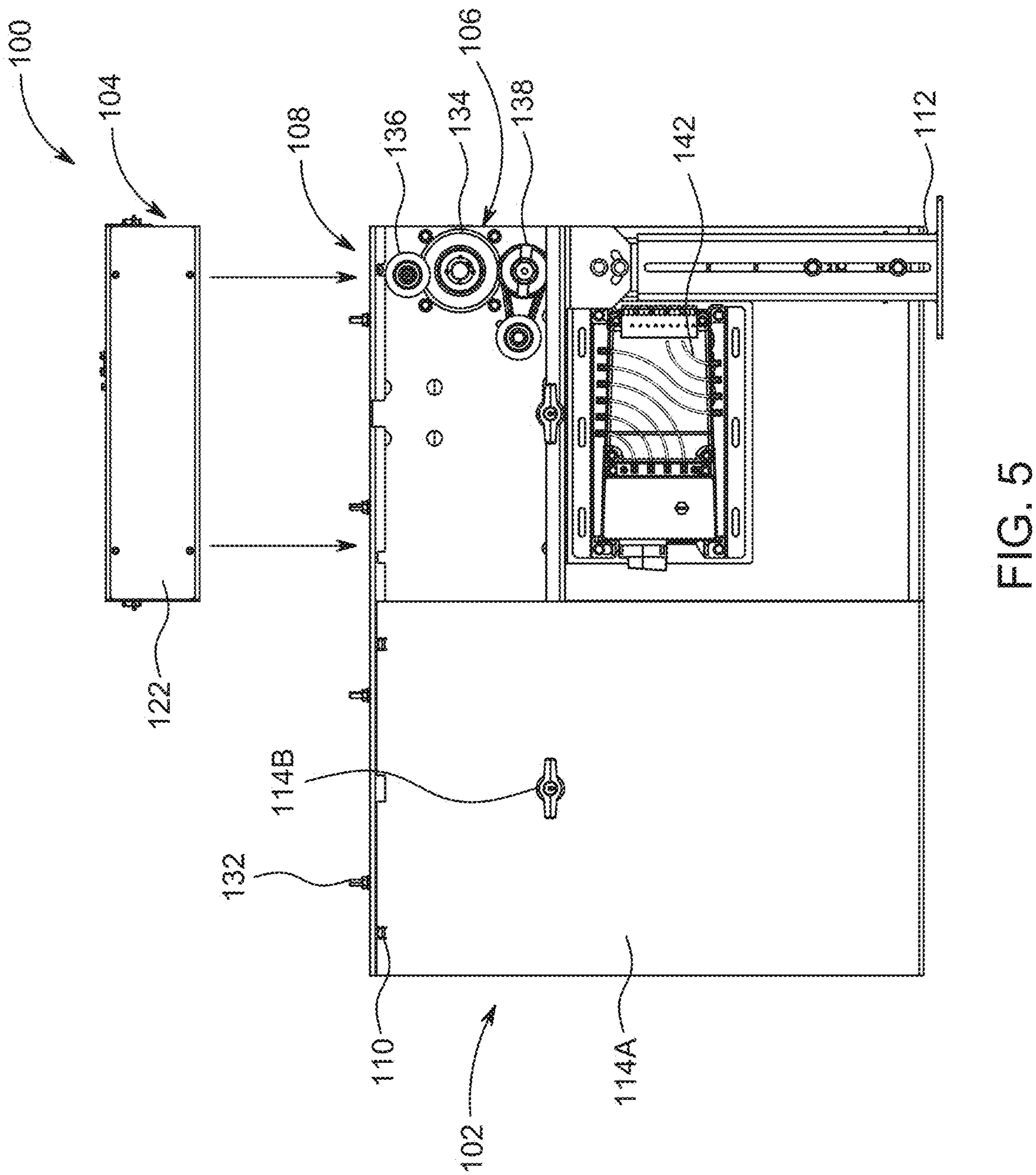
Figure 6:
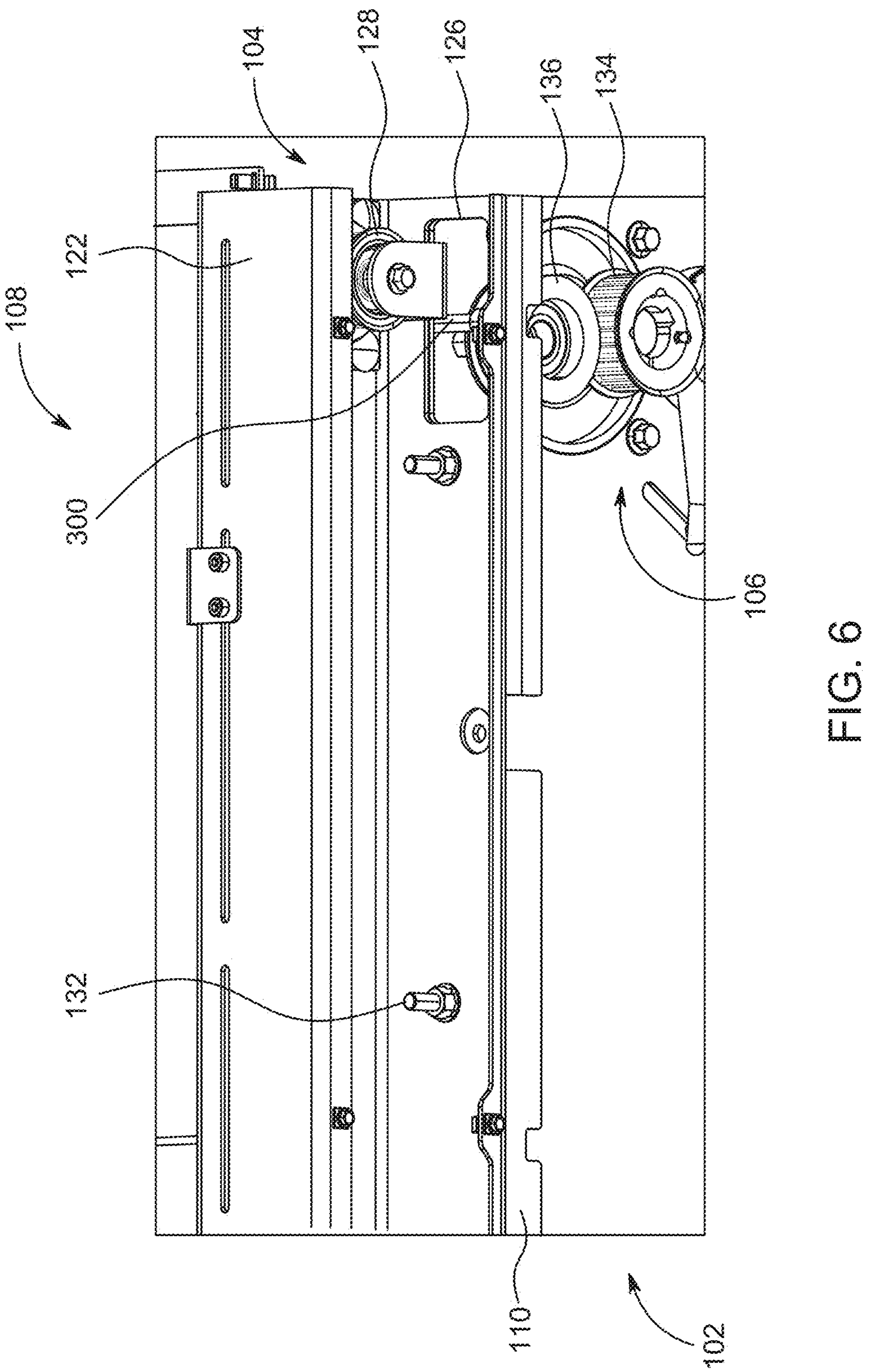
Figure 7:
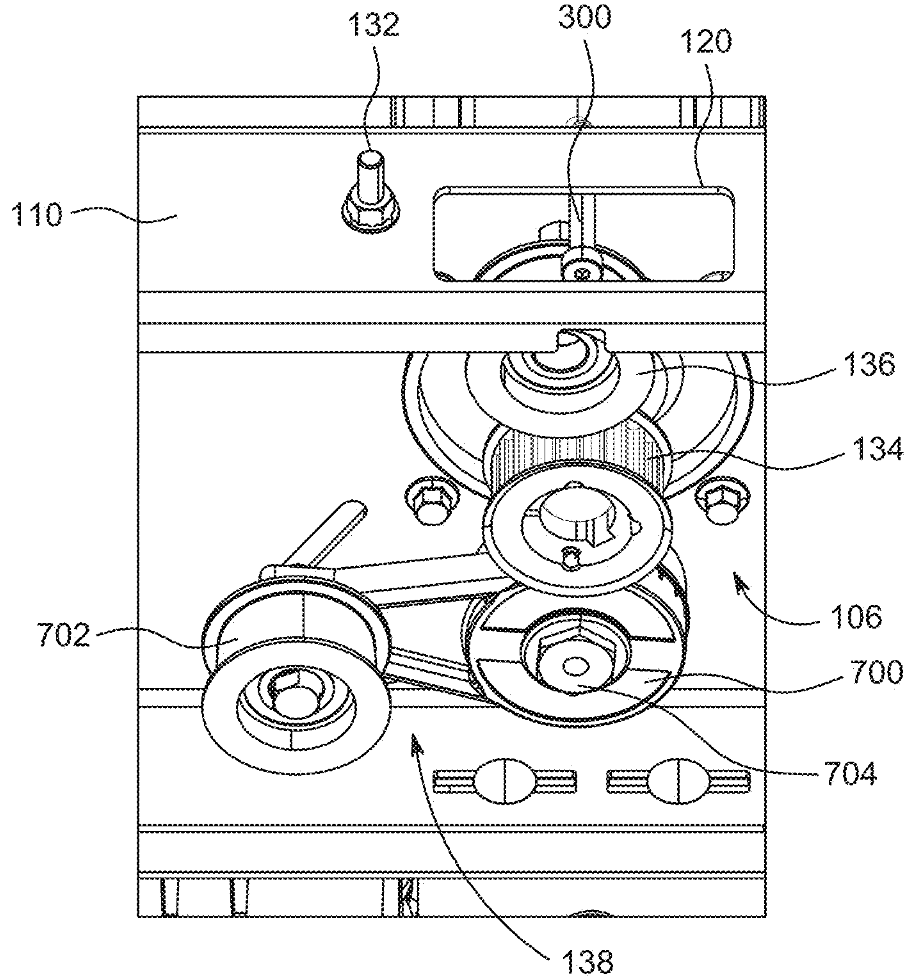
Figure 8:
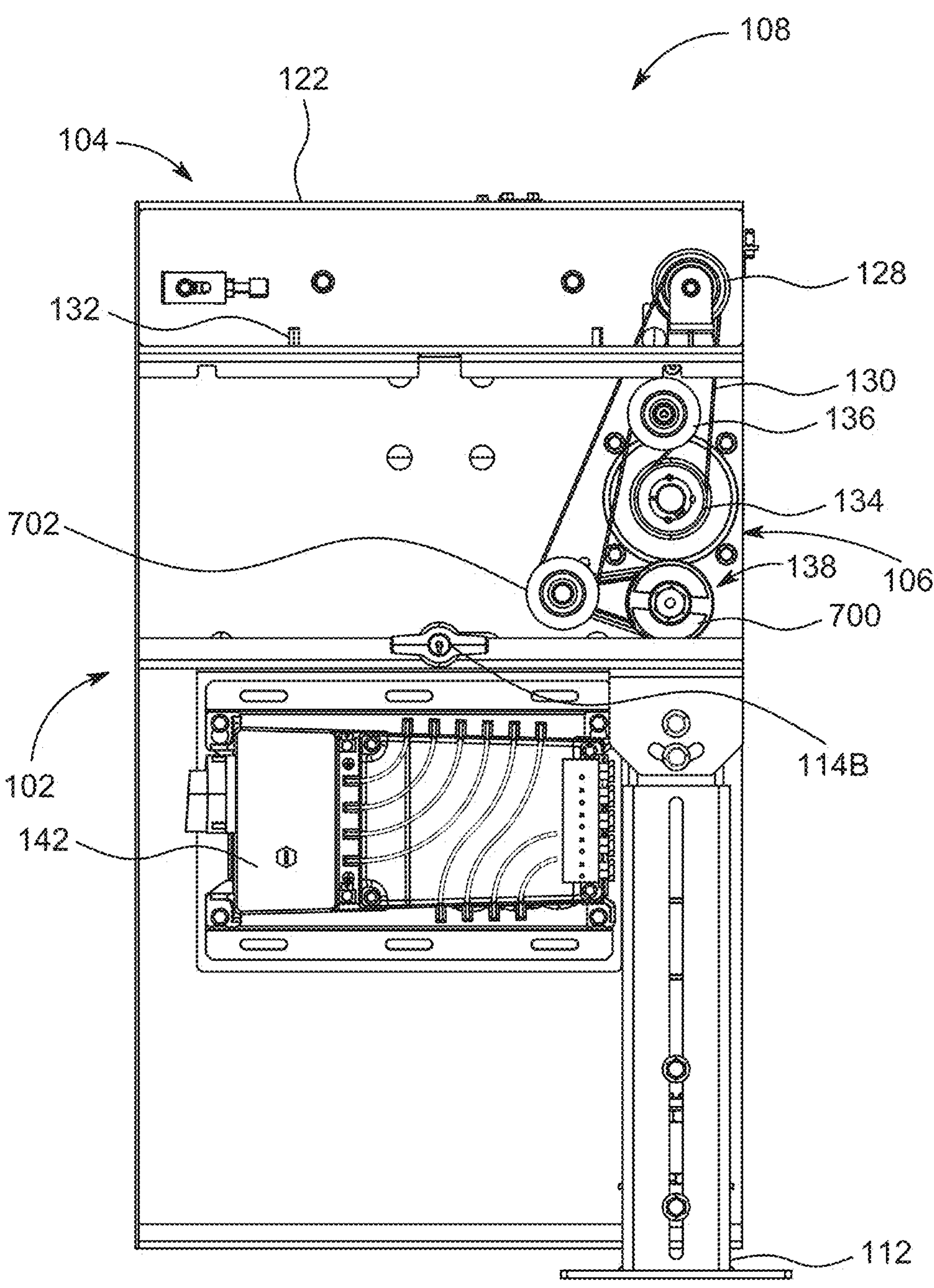
Figure 9:
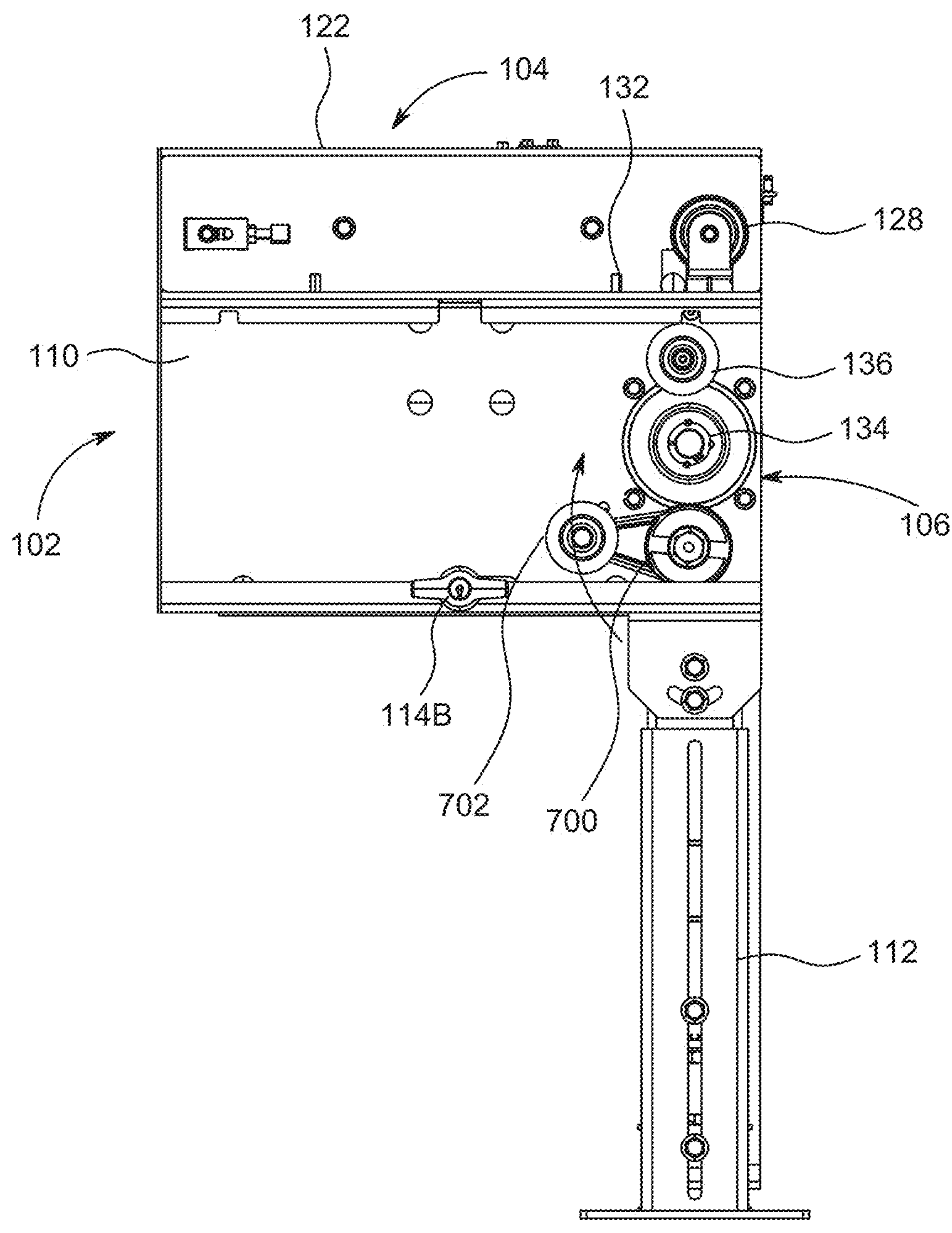
Figure 10:
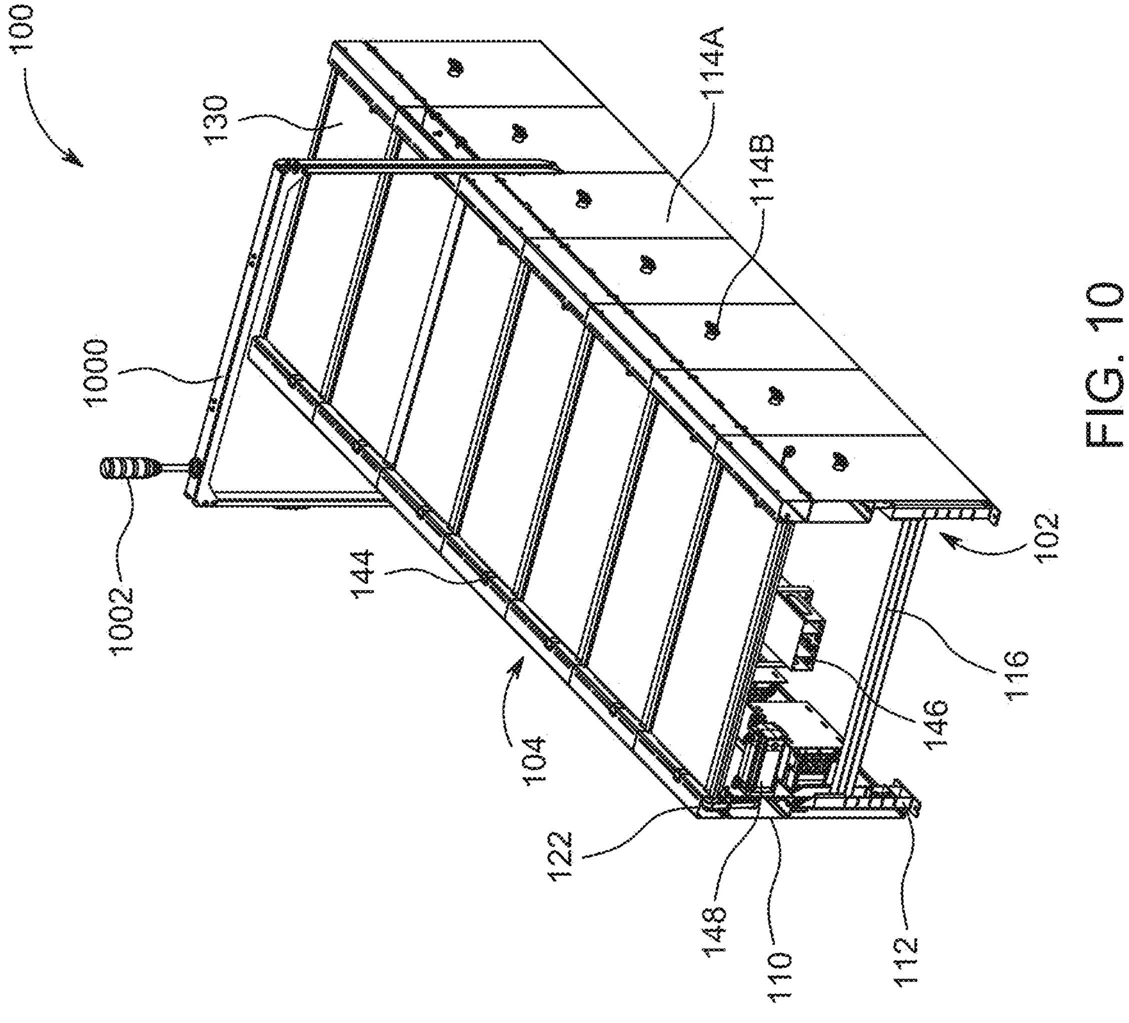
Figure 11:
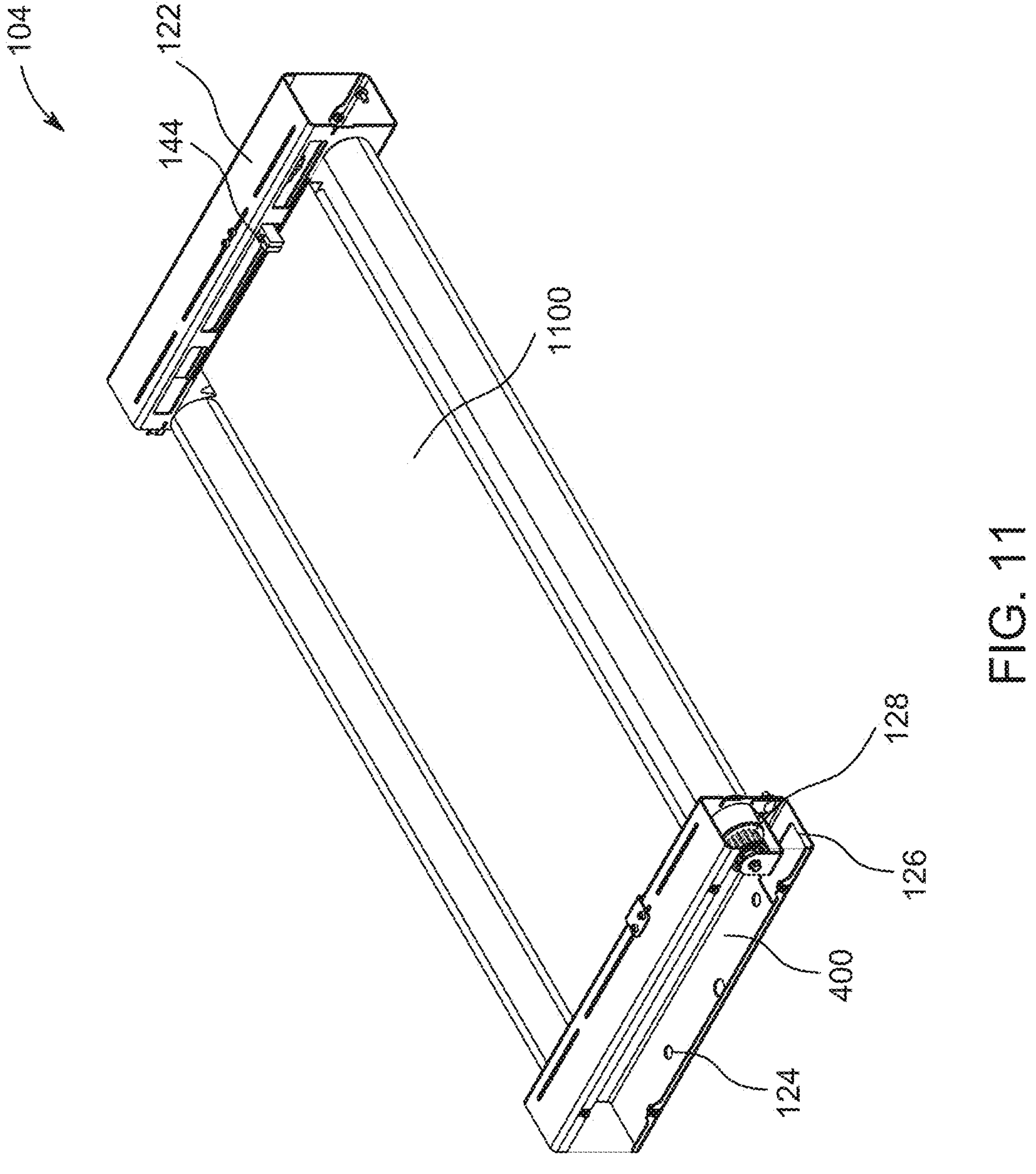
Figure 12:
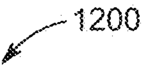
Figure 13:
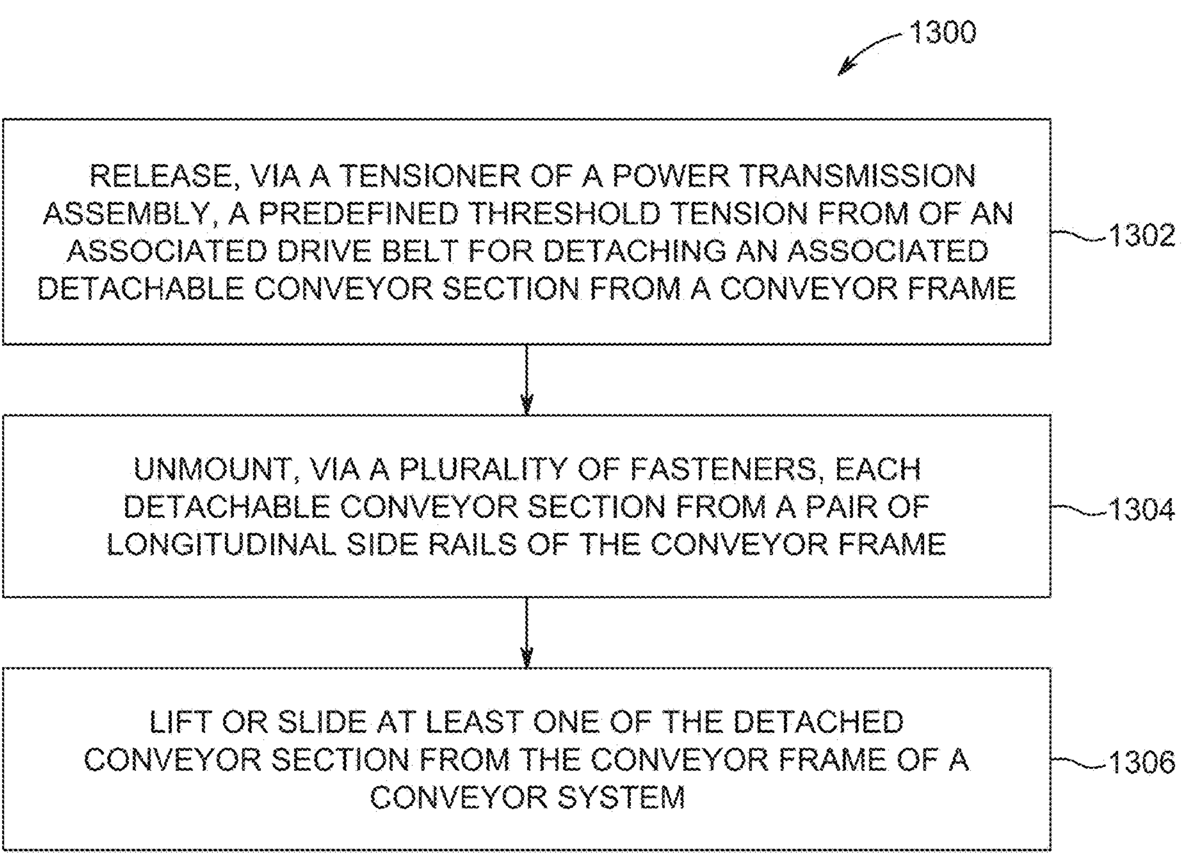

Having thus described certain example embodiments of the present disclosure in general terms, reference will hereinafter be made to the accompanying drawings, which are not necessarily drawn to scale, and wherein:

FIG. 1A illustrates a top view of a conveyor system in accordance with an example embodiment of the present disclosure;

FIG. 1B illustrates an isometric view of the conveyor system in accordance with an example embodiment of the present disclosure;

FIG. 2 illustrates an isometric view of a conveyor frame of the conveyor system in accordance with an example embodiment of the present disclosure;

FIG. 3 illustrates an enlarged view of one of a pair of longitudinal side rails of one zone from a plurality of zones of the conveyor frame in accordance with an example embodiment of the present disclosure;

FIG. 4 illustrates an isometric view of a detachable conveyor section from a plurality of detachable conveyor sections in accordance with an example embodiment of the present disclosure;

FIG. 5 illustrates a side view showing installation of the detachable conveyor section from the plurality of detachable conveyor sections with the conveyor frame in accordance with an example embodiment of the present disclosure;

FIG. 6 illustrates an enlarged view of the detachable conveyor section from the plurality of detachable conveyor sections coupled with conveyor frame in accordance with an example embodiment of the present disclosure;

FIG. 7 illustrates an enlarged view of a power transmission assembly in accordance with an example embodiment of the present disclosure;

FIG. 8 illustrates a side view of at least one zone from the plurality of zones of the conveyor system in accordance with an example embodiment of the present disclosure;

FIG. 9 illustrates another side view of at least one zone from the plurality of zones of the conveyor system while releasing a drive belt in accordance with an example embodiment of the present disclosure;

FIG. 10 illustrates an isometric view of the conveyor system in accordance with an example embodiment of the present disclosure;

FIG. 11 illustrates an isometric view of the detachable conveyor section from the plurality of detachable conveyor sections in accordance with an example embodiment of the present disclosure;

FIG. 12 illustrates a flowchart of a method for coupling of the detachable conveyor section with the conveyor frame of the conveyor system in accordance with an example embodiment of the present disclosure; and FIG. 13 illustrates a flowchart of a method for decoupling of the detachable conveyor section from the conveyor frame of the conveyor system in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a conveyor system and a method thereof. Embodiments may comprise a conveyor frame and a plurality of detachable conveyor sections. Embodiments may comprise a plurality of zones and a pair of longitudinal side rails extending through at least one of the plurality of zones. Embodiments may be associated with a distinct detachable conveyor section of the plurality of detachable conveyor sections and may include a power transmission assembly. Embodiments may be configured to detachably mount each detachable conveyor section to the pair of longitudinal side rails via a plurality of fasteners and includes a conveyor section drive pulley. Embodiments may include a conveyor frame drive pulley, an idler pulley, a tensioner, and a drive belt around the conveyor frame drive pulley, the idler pulley, the tensioner, and the conveyor section drive pulley of the associated detachable conveyor section. Embodiments may be configured to release tension of an associated drive belt for detaching an associated detachable conveyor section from the conveyor frame.

FIG. 1A illustrates a top view of a conveyor system 100, in accordance with an example embodiment of the present disclosure. FIG. 1B illustrates an isometric view of the conveyor system 100, in accordance with an example embodiment of the present disclosure.

In some embodiments, the conveyor system 100 may comprise a conveyor frame 102, a plurality of detachable conveyor sections 104 and a power transmission assembly 106. In some embodiments, the conveyor system 100 may be installed within a facility. Further, the facility may correspond to a warehouse, a material loader, etc. In some embodiments, the conveyor system 100 may be configured to transport one or more objects from a source end to a destination end within the facility. In some embodiments, the one or more objects may correspond to one or more parcels.

In some embodiments, the conveyor system 100 may comprise the conveyor frame 102. In some embodiments, the conveyor frame 102 may be configured to serve as a platform that may facilitate installation of one or more electronic components, one or more electrical components, and one or more mechanical components associated with the conveyor system 100. In some embodiments, the conveyor frame 102 may be constructed by involving one or more machining processes such as drilling, welding, fastening, etc. In one example, the conveyor frame 102 may be constructed by using one or more pieces of sheet metal. In some embodiments, the conveyor frame 102 may comprise a plurality of zones 108 and a pair of longitudinal side rails 110 that may extend through at least one of the plurality of zones 108. In some embodiments, each zone from the plurality of zones 108 of the conveyor frame 102 may be associated with a distinct detachable conveyor section of the plurality of detachable conveyor sections 104.

In some embodiments, the pair of longitudinal side rails 110 may be configured to facilitate installation of the one or more electrical components and the one or more mechanical components. In some embodiments, the pair of longitudinal side rails 110 may be configured to define width of the conveyor frame 102. In some embodiments, each of the pair of longitudinal side rails 110 may be installed with a plurality of load supporting members 112. In some embodiments, the plurality of load supporting members 112 may be configured to provide support to the conveyor frame 102 over a ground surface. In some embodiments, each of the plurality of load supporting members 112 may be separated by a predefined threshold distance. Further, each of the plurality of load supporting members 112 may be coupled with the pair of side rails 110 through fasteners, lock nuts, etc. In one example, each of the pair of longitudinal side rails 110 may be directly mounted with a floor without requiring the load supporting members 112. In some embodiments, the load supporting members 112 may be of varying geometry not necessarily as described in FIGS. 1A and 1B. In one example, each of the pair of longitudinal side rails 110 may be coupled with a plurality of side panels 114A (as illustrated in FIG. 1B). Further, each of the plurality of side panels 114A may be configured to cover lateral sides of the conveyor frame 102 to cover exposed portions of the one or more electrical and the one or more mechanical components associated with the conveyor system 100. In the same example, each of the plurality of side panels 114A may be locked with the pair of longitudinal side rails 110 through at least one rotatable knob 114B. In the same example, each of the at least one rotatable knob 114B may be configured to be rotated over a rotating axis in a clockwise direction or in an anticlockwise direction.

As illustrated in FIG. 1B, the conveyor frame 102 may further comprise a plurality of cross bars 116. In some embodiments, each of the plurality of cross bars 116 may be coupled between each of the pair of longitudinal side rails 110. In some embodiments, the plurality of cross bars 116 may be configured to provide strength to the conveyor frame 102 while handling one or more objects. In one example, the conveyor frame 102 may further comprise a cable tray 146. in some embodiments, the cable tray 146 may be supported by the plurality of cross bars 116. In same example, the cable tray 146 may be configured to carry a plurality of electrical cables connected with the one or more electrical components associated with the conveyor system 100. It may be noted that the cable tray 146 may be installed based on requirements of the user.

In some embodiments, the pair of longitudinal side rails 110 may further comprise the first set of apertures 118. In some embodiments, the first set of apertures may be fabricated on each side rail of the pair of longitudinal side rails 110. In some embodiments, the first set of apertures 118 may be fabricated on each of the pair of longitudinal side rails 110 through one or more processes such as drilling. In some embodiments, the pair of longitudinal side rails 110 of each zone from the plurality of zones 108 of the conveyor frame 102 may be fabricated with a pair of apertures from the first set of apertures 118. In some embodiments, each of the first set of apertures 118 may be separated by a predefined threshold distance. In one example, each of the first set of apertures 118 may be crafted with a plurality of internal threads.

In some embodiments, the pair of longitudinal side rails 110 of each zone may further comprise a first cavity 120. In some embodiments, the first cavity 120 may be fabricated at one of the pair of longitudinal side rails 110. In some embodiments, the first cavity 120 may be fabricated through one or more processes that may include but not limited to cutting, grinding or like. In some embodiments, the first cavity 120 may be crafted with a shape that may include but not limited to a rectangular shape, a circular shape, a square shape, etc. In some embodiments, when the shape of the first cavity 120 may correspond to the rectangular shape, the first cavity 120 may define one or more dimensions. Further, the one or more dimensions may correspond to a length of 95 mm and a width of 42 mm.

In some embodiments, the conveyor system 100 may further comprise the plurality of detachable conveyor sections 104. In some embodiments, the distinct detachable conveyor section of the plurality of detachable conveyor sections 104 may be associated with each zone of plurality of zones 108 of the conveyor frame 102. In some embodiments, the plurality of detachable conveyor sections 104 may be configured to be coupled with the pair of longitudinal side rails 110 of each zone from the plurality of zones 108. In some embodiments, each of the plurality of detachable conveyor sections 104 may comprise a pair of longitudinal side frames 122 for each zone. In some embodiments, the pair of longitudinal side frames 122 may be configured to be positioned over the pair of longitudinal side rails 110 of each zone. In some embodiments, the pair of longitudinal side frames 122 may be configured to facilitate installation of the one or more mechanical components such as fasteners, cross bars, panels, etc. associated with each of the plurality of detachable conveyor sections 104. In one example, each of the pair of longitudinal side frames 122 may be constructed with a single piece of sheet metals. In another example, each of the pair of longitudinal side frames 122 may be constructed with a plurality of pieces of sheet metals. In some embodiments, the pair of longitudinal side frames 122 may be crafted with a shape that may comprise at least one of a C-shape, inverted C-shape, etc. In some embodiments, each of the pair of longitudinal side frames 122 may be separated by a predefined distance of that may range between 1000-1500 mm.

In some embodiments, each of the pair of longitudinal side frames 122 may comprise a second set of apertures 124 and a second cavity 126. In some embodiments, the second set of apertures 124 may be fabricated on each longitudinal side frame of the pair of longitudinal side frames 122. In some embodiments, the second set of apertures 124 may be fabricated on each of the pair of longitudinal side frames 122 through one or more processes such as drilling. In some embodiments, the pair of longitudinal side frames 122 of each of the plurality of detachable conveyor sections 104 that may be positioned over each zone from the plurality of zones 108 of the conveyor frame 102 may be fabricated with a pair of apertures from the second set of apertures 124. In some embodiments, each of the second set of apertures 124 may be separated by a predefined threshold distance. In one example, each of the second set of apertures 124 may be crafted with a plurality of internal threads.

In some embodiments, the pair of longitudinal side frames 122 of each zone may further comprise a second cavity 126. In some embodiments, the second cavity 126 may be fabricated at one of the pair of longitudinal side frames 122. In some embodiments, the second cavity 126 may be fabricated through one or more processes that may include but not limited to cutting, grinding or like. In some embodiments, the second cavity 126 may be crafted with a shape that may include but not limited to a rectangular shape, a circular shape, a square shape, etc. In some embodiments, when the shape of the second cavity 126 may correspond to the rectangular shape, the second cavity 126 may define one or more dimensions. Further, the one or more dimensions may correspond to a length of 95 mm and a width of 42 mm.

In some embodiments, each of the plurality of detachable conveyor sections 104 may further comprise a conveyor section drive pulley 128, at least one idler roller and at least one conveyor belt 130. In some embodiments, the conveyor section drive pulley 128 may be coupled between the pair of longitudinal side frames 122. In some embodiments, the conveyor section drive pulley 128 may define a rotating axis. In some embodiments, the conveyor section drive pulley 128 may be configured to rotate on the rotating axis. Further, the conveyor section drive pulley 128 may comprise a set of bearings that may facilitate rotations of the conveyor section drive pulley 128 over the rotating axis. In some embodiments, the conveyor section drive pulley 128 may be constructed with a shape that may correspond to a circular shape. In some embodiments, the conveyor section drive pulley 128 may be constructed with a material that may withstand various environmental conditions such as high temperature, high humidity, heavy payload, etc.

In some embodiments, the conveyor section drive pulley 128 may be coupled between at one end of each of the pair of longitudinal side frames 122. In some embodiments, the at least one idler roller may be coupled between another end of each of the pair of longitudinal side frames 122. In some embodiments, the at least one idler roller may be wrapped with the at least one conveyor belt 130. In some embodiments, the at least one conveyor belt 130 may be configured to rotate during rotations of the conveyor section drive pulley 128. In some embodiments, the conveyor section drive pulley 128 is the driving pulley that rotates and forces the at least one conveyor belt 130 to rotate along the at least one idler roller.

In some embodiments, the at least one conveyor belt 130 may be constructed with a thickness of 2 mm, a width of 500 mm and a length that may range between 1000-1500 mm. In some embodiments, the width of the at least one conveyor belt 130 may be selected such that each of the one or more objects may be accommodated over each of the plurality of detachable conveyor sections 104. In some embodiments, the at least one conveyor belt 130 may be composed of a material that may prevent loosening of the at least one conveyor belt 130 after usage of the at least one conveyor belt 130 over a period of time. In some embodiments, the at least one conveyor belt 130 may define a rotating axis. Further, the at least one conveyor belt 130 may be configured to rotate over the rotating axis.

In some embodiments, the pair of longitudinal side frames 122 of each of the plurality of detachable conveyor sections 104 may be placed over the pair of longitudinal side rails 110 of each zone from the plurality of zones 108 of the conveyor frame 102. In some embodiments, each of the plurality of detachable conveyor sections 104 may be configured to be detachably coupled with the pair of longitudinal side rails 110 for each zone of the plurality of zones 108. In some embodiments, the pair of longitudinal side frames 122 of each of the plurality of detachable conveyor sections 104 may be placed over the pair of longitudinal side rails 110 of each zone from the plurality of zones 108. Further, the first set of apertures 118 of the pair of longitudinal side rails 110 may be configured to align with the second set of apertures 124 of the pair of longitudinal side frames 122 of the plurality of detachable conveyor sections 104. In some embodiments, each of the plurality of detachable conveyor sections 104 may be configured to be detachably couple with the at least one longitudinal side rails 110 for each zone by locking the first set of apertures 118 with the second set of apertures 124 via a plurality of fasteners 132.

In some embodiments, the plurality of fasteners 132 may be configured to be manually engaged into the aligned first set of apertures 118 and the aligned second set of apertures 124. In some embodiments, the plurality of fasteners 132 may correspond to a threaded bolt and a nut, a rivet, a lock pin, etc. In some embodiments, the plurality of fasteners 132 may be configured to be fastened with the first set of apertures 118 and the second set of apertures 124 through the plurality of internal threads of the first set of apertures 118 and the second set of apertures 124.

In some embodiments, the conveyor system 100 may further comprise the power transmission assembly 106. In some embodiments, the power transmission assembly 106 may be operationally coupled with the conveyor section drive pulley 128. In some embodiments, the power transmission assembly 106 may be configured to drive the conveyor section drive pulley 128. In some embodiments, the power transmission assembly 106 may be installed with one of the pair of longitudinal side rails 110. In some embodiments, the power transmission assembly 106 may comprise a conveyor frame drive pulley 134. In some embodiments, the conveyor frame drive pulley 134 may be coupled with one of the pair of longitudinal side rails 110. In some embodiments, the power transmission assembly 106 may further comprise an idler pulley 136, a tensioner 138 and a drive belt 140.

In some embodiments, the conveyor frame drive pulley 134 may be configured to rotate on its axis when supplied with a predefined amount of power. In some embodiments, the conveyor frame drive pulley 134 may be coupled with an electric motor 148. In one example, the electric motor 148 may be an AC motor, a DC motor, and a servo motor. In an example, the electric motor 148 of the conveyor frame drive pulley 134 may be operationally coupled with a motor driver 142 (as illustrated in FIGS. 1A and 1B) such as a variable frequency drive (VFD). In some embodiments, the motor driver 142 may be configured to control movement of the electric motor 148. In another example, the electric motor 148 of the conveyor frame drive pulley 134 may be integrated with the motor driver 142. Further, the motor driver 142 integrated within the electric motor 148 may be configured to control movement of the electric motor 148. In some embodiments, the drive belt 140 may be wrapped around the conveyor frame drive pulley 134, the idler pulley 136, and the tensioner 138. In some embodiments, the drive belt 140 may be configured transmit rotational motion of the conveyor frame drive pulley 134 to the idler pulley 136, the tensioner 138, and the conveyor section drive pulley 128. In some embodiments, the drive belt 140 may be configured to rotate along with the rotations of the conveyor section drive pulley 128.

In some embodiments, the idler pulley 136 may be configured to rotate on its axis during movement of the drive belt 140. In some embodiments, the idler pulley 136 may be configured to provide support to the drive belt 140 during rotations of the drive belt 140. In some embodiments, the idler pulley 136 may comprise a set of bearings. In some embodiments, the set of bearings may facilitate rotations of the idler pulley 136 during movement of the drive belt 140. In one example, the drive belt 140 of the power transmission assembly 106 may be directly coupled with the tensioner 138 without using the idler pulley 136. In some embodiments, the tensioner 138 may be configured to maintain a predefined tension over the drive belt 140. In some embodiments, the tensioner 138 may be configured to move from one position to another position at a predefined angle to create the tension over the drive belt 140.

In some embodiments, the drive belt 140 may be configured to be operationally connected to the conveyor section drive pulley 128 and the conveyor frame drive pulley 134. In some embodiments, the drive belt 140 may be configured to be passed through the first cavity 120 and the second cavity 126. In some embodiments, the drive belt 140 may be configured to actuate the plurality of detachable conveyor sections 104 via the power transmission assembly 106. In some embodiments, when the power transmission assembly 106 may be supplied with a predefined amount of power, the conveyor frame drive pulley 134 may rotate on its axis to drive the drive belt 140. Further, the drive belt 140 may be configured to drive the conveyor section drive pulley 128. Further, the conveyor frame drive pulley 134 may be operationally coupled with the at least one conveyor belt 130. Further, during the rotations of the conveyor frame drive pulley 134, the at least one conveyor belt 130 may be configured to rotate that facilitates movement of the one or more objects over the conveyor system 100.

In some embodiments, the conveyor system 100 further comprise at least one photo-eye sensor 144. In some embodiments, the at least one photo-eye sensor 144 may be mounted on one of the pair of longitudinal side frames 122 of the plurality of detachable conveyor sections 104. In some embodiments, the at least one photo-eye sensor 144 may be configured to detect presence of the one or more objects placed over the plurality of detachable conveyor sections 104. In some embodiments, the at least one photo-eye sensor 144 may be configured to determine a precise positioning of the at least one or more objects placed over the plurality of detachable conveyor sections 104. Further, based at least on the detected presence and precise positioning, the motor driver 142 may be configured to control rotations of the electric motor 148 coupled with the conveyor frame drive pulley 134.

FIG. 2 illustrates an isometric view of the conveyor frame 102 of the conveyor system 100, in accordance with an example embodiment of the present disclosure. FIG. 3 illustrates an enlarged view of one of the pair of longitudinal side rails 110 of one zone from the plurality of zones 108 of the conveyor frame 102, in accordance with an example embodiment of the present disclosure. FIGS. 2 and 3 are described in conjunction with FIGS. 1A and 1B.

In some embodiments, the conveyor frame 102 may be configured to be installed on a ground surface of the facility. In some embodiments, the conveyor frame 102 may comprise the plurality of load supporting members 112. In some embodiments, the plurality of load supporting members 112 may be configured to provide support to the conveyor frame 102 over the ground surface. In some embodiments, each of the plurality of load supporting members 112 may be crafted with a shape that may include but not limited to a U-shape, an inverted U-shape, a H-shape, etc. In some embodiments, the conveyor frame 102 may be rigidly mounted over the plurality of load supporting members 112. In some embodiments, the conveyor frame 102 may comprise the plurality of zones 108. In some embodiments, each of the plurality of zones 108 may be segregated in a cascaded manner.

In some embodiments, each of the plurality of zones 108 may correspond to a predefined portion of the conveyor frame 102. In some embodiments, each of the plurality of zones 108 of the conveyor frame 102 may be configured to perform an individual operation. In one example, each of the plurality of zones 108 may be operated separately. In some embodiments, each of the plurality of zones 108 may be provided with respective electrical components from the one or more electrical components, electronic components from the one or more electronic components, and mechanical components from the one or more mechanical components of the conveyor system 100.

As illustrated in FIG. 3, each of the plurality of zones 108 of one of the pair of longitudinal side rails 110 may comprise the first set of apertures 118. Further, each of the first set of apertures 118 may be configured to be engaged with at least one fastener from the plurality of fasteners 132. In some embodiments, each of the plurality of fasteners 132 may be firstly engaged with each of the first set of apertures 118. In some embodiments, one of the pair of longitudinal side rails 110 may be fabricated with the first cavity 120. Further, the power transmission assembly 106 may be positioned underneath the first cavity 120 (as illustrated in FIG. 3). In some embodiments, the power transmission assembly 106 may be configured to be coupled with one of the pair of longitudinal side rails 110 of each zone from the plurality of zones 108 through a pair of bolts and nuts. Further, the pair of bolts and nuts may be configured to secure the power transmission assembly 106 with one of the pair of longitudinal side rails 110.

In some embodiments, one of the pair of longitudinal side rails 110 may further comprise at least one stud 300. In some embodiments, the at least one stud 300 may be monolithic or coupled with one of the pair of longitudinal side rails 110. In some embodiments, the at least one stud 300 may be configured to be positioned between the first cavity 120 and the power transmission assembly 106. In some embodiments, the at least one stud 300 may be configured to facilitate resting of the drive belt 140 when the distinctive detachable conveyor section from the plurality of detachable conveyor sections 104 may be detached from the conveyor frame 102. In some embodiments, the at least one stud 300 may define a length of 60 mm. In some embodiments, the length of the at least one stud 300 may be selected to provide a proper support to the drive belt 140.

FIG. 4 illustrates an isometric view of a detachable conveyor section from the plurality of detachable conveyor sections 104, in accordance with an example embodiment of the present disclosure. FIG. 4 is described in conjunction with FIGS. 1A-3.

In some embodiments, each of the plurality of detachable conveyor sections 104 may be configured to be detachably couple with each zone of the plurality of zones 108 of the pair of longitudinal side rails 110. In some embodiments, each of the plurality of detachable conveyor sections 104 may be configured to be secured with each zone of the plurality of zones 108 of the pair of longitudinal side rails 110 through the plurality of fasteners 132. In some embodiments, each of the plurality of detachable conveyor sections 104 may comprise the pair of longitudinal side frames 122, the conveyor section drive pulley 128, the at least one idler roller and the at least one conveyor belt 130. In one example, the plurality of detachable conveyor sections 104 may further comprise a pair of side covers 400. The pair of side covers 400 may be configured to be detachably coupled with the pair of longitudinal side frames 122 of the plurality of detachable conveyor sections 104. The pair of side covers 400 may be configured to prevent dust/dirt to accumulate within the pair of longitudinal side frames 122 and the conveyor section drive pulley 128.

In one example, each of the pair of side covers 400 may be composed of a material that may include but not limited to metal sheet, plastic, Polyvinyl chloride (PVC), etc. In one example, each of the pair of side covers 400 may be configured to be attached with each of the pair of longitudinal side frames 122 through one or more snap-in locks. In another example, each of the pair of side covers 400 may be configured to be attached with each of the pair of longitudinal side frames 122 through one or more slide-in locks. In one example, each of the plurality of detachable conveyor sections 104 may be configured to independently move the one or more objects over each of the plurality of zones 108 of the conveyor frame 102. It may be noted that the pair of side covers 400 may be customized based on requirement of the user.

FIG. 5 illustrates a side view showing installation of the detachable conveyor section from the plurality of detachable conveyor sections 104 with the conveyor frame 102, in accordance with an example embodiment of the present disclosure. FIG. 6 illustrates an enlarged view of the detachable conveyor section from the plurality of detachable conveyor sections 104 coupled with conveyor frame 102, in accordance with an example embodiment of the present disclosure.

In some embodiments, each of the plurality of detachable conveyor sections 104 may be configured to be positioned over each zone of the plurality of zones 108 of the pair of longitudinal side rails 110 of the conveyor frame 102. In some embodiments, each of the plurality of detachable conveyor sections 104 may comprise the pair of longitudinal side frames 122. Further, the pair of longitudinal side frames 122 of each of the plurality of detachable conveyor sections 104 may be aligned with the pair of longitudinal side rails 110 of the conveyor frame 102. In some embodiments, each of the pair of longitudinal side frames 122 may be fabricated with the second set of apertures 124. In some embodiments, each of the pair of longitudinal side rails 110 may be fabricated with the first set of apertures 118. In some embodiments, each of the plurality of detachable conveyor sections 104 may be positioned over the conveyor frame 102 by moving each of the plurality of detachable conveyor sections 104 in a vertically downward direction. In some embodiments, each of the plurality of detachable conveyor sections 104 may be secured with the conveyor frame 102 by engaging the plurality of fasteners 132 into the first set of apertures and the second set of apertures 124.

In some embodiments, upon coupling of the plurality of detachable conveyor sections 104 with the conveyor frame 102, the first cavity 120 of one of the pair of longitudinal side rails 110 may get aligned with the second cavity 126 of one of the pair of longitudinal side frames 122. In some embodiments, the drive belt 140 may be coupled with the conveyor section drive pulley 128, after successful coupling of the plurality of detachable conveyor sections 104. In some embodiments, the drive belt 140 may be configured to be wrapped around the conveyor section drive pulley 128, after coupling of each of the plurality of detachable conveyor sections 104 with the conveyor frame 102.

FIG. 7 illustrates an enlarged view of the power transmission assembly 106, in accordance with an example embodiment of the present disclosure. FIG. 8 illustrates a side view of at least one zone from the plurality of zones 108 of the conveyor system 100, in accordance with an example embodiment of the present disclosure. FIGS. 7 and 8 are described in conjunction with FIGS. 1A-6.

In some embodiments, the power transmission assembly 106 may comprise the conveyor frame drive pulley 134, the idler pulley 136, the tensioner 138 and the drive belt 140. In some embodiments, the drive belt 140 may be configured to be wrapped around the conveyor frame drive pulley 134, the idler pulley 136, the tensioner 138, and the conveyor section drive pulley 128 after coupling of the plurality of detachable conveyor sections 104 with the frame. In some embodiments, the tensioner 138 may be configured to maintain the predefined tension over the drive belt 140. In some embodiments, the tensioner 138 may comprise at least one lever 700 and another idler pulley 702. In some embodiments, the at least one lever 700 may be rotated in one or more directions to create the predefined tension over the drive belt 140.

In some embodiments, the tensioner 138 may be secured with one of the pair of longitudinal side rails 110 through a fastener 704. In some embodiments, the fastener 704 of the tensioner 138 may be tightened by applying an external force on the fastener 704. In some embodiments, the fastener 704 may be configured to be locked at a position that may facilitate coupling of the tensioner 138 with the one of the pair of longitudinal side rails 110. In some embodiments, the fastener 704 may correspond to a hex screw. In some embodiments, the tensioner 138 may comprise a first portion and a second portion. Further, the first portion of the tensioner 138 may be secured with one of the pair of longitudinal side rails 110 through the fastener 704. Further, the second portion of the tensioner 138 may comprise the another idler pulley 702 that may facilitate movement of the drive belt 140. Further, the tensioner 138 may comprise a screw (not shown) with an independent component (not shown). Further, the screw with the independent component may be configured to facilitate generation of the predefined tension over the drive belt 140. Further, the another idler pulley 702 that facilitate movement of the drive belt 140 while maintaining the predefined tension (as shown in FIG. 8).

FIG. 9 illustrates another side view of at least one zone from the plurality of zones 108 of the conveyor system 100 while releasing the drive belt 140, in accordance with an example embodiment of the present disclosure.

In some embodiments, the tensioner 138 may be operationally coupled with the power transmission assembly 106. Further, the tensioner 138 may be configured to release the predefined tension from an associated drive belt 140 of the associated detachable conveyor section. In some embodiments, the tensioner 138 may be loosened by applying the external force on the at least one lever 700. In some embodiments, the tensioner 138 may comprise the at least one lever 700. In some embodiments, the tensioner 138 may be moved from one position to another position through the at least one lever 700. In some embodiments, the drive belt 140 may be decoupled from the conveyor section drive pulley 128. Further, the pair of longitudinal side rails 110 may further comprise the at least one stud 300. Further, the at least one stud 300 may be configured to hold the drive belt 140 when the drive belt 140 may be released from the conveyor section drive pulley 128. Further, the plurality of fasteners 132 of the pair of longitudinal side rails 110 may be released from the first set of apertures 118 and the second set of apertures 124 to detach each of the plurality of detachable conveyor sections 104 from the pair of longitudinal side rails 110.

In some embodiments, upon detaching each of the plurality of detachable conveyor sections 104 from the pair of longitudinal side rails 110, each of the plurality of detachable conveyor sections 104 may be removed from the conveyor frame 102 by lifting and sliding each of the plurality of detachable conveyor sections 104. In one instance, when the plurality of fasteners 132 may be completely released only from the first set of apertures 118 of the pair of longitudinal side rails 110, each of the plurality of detachable conveyor sections 104 may be lifted to detach each of the plurality of detachable conveyor sections 104 from the conveyor frame 102. In another instance, when the plurality of fasteners 132 may be completely released from the first set of apertures 118 of the pair of longitudinal side rails 110 and the second set of apertures 124 of the pair of longitudinal side frames 124, each of the plurality of detachable conveyor sections 104 may be slided to detach each of the plurality of detachable conveyor sections 104 from the conveyor frame 102.

FIG. 10 illustrates an isometric view of the conveyor system 100, in accordance with an example embodiment of the present disclosure. FIG. 10 is described in conjunction with FIGS. 1A-9.

In some embodiments, the conveyor system 100 may be configured to move the one or more objects from one end to another end. In some embodiments, the conveyor system 100 may be installed within the facility. In some instances, the conveyor system 100 may require one or more peripherals to operate properly. Further, the one or more peripherals of the conveyor system 100 may comprise a bridge 1000. In an example, the bridge 1000 of the conveyor system 100 may be installed with an alarm unit 1002. In an example, the alarm unit 1002 may be configured to illuminate lights of various colors. Further, the various colors of the lights may correspond to a plurality of operations of the conveyor system 100. Further, each of the plurality of detachable conveyor sections 104 of the conveyor system 100 may be installed with the at least one photo-eye sensor 144. In some embodiments, the at least one photo-eye sensor 144 may be configured to determine positioning of the one or more objects placed over the plurality of detachable conveyor sections 104. In some embodiments, the power transmission assembly 106 may be configured to provide movement to the at least one conveyor belt 130 of each of the plurality of detachable conveyor sections 104 through the drive belt 140.

FIG. 11 illustrates an isometric view of the detachable conveyor section from the plurality of detachable conveyor sections 104, in accordance with an example embodiment of the present disclosure.

In some embodiments, the plurality of detachable conveyor sections 104 may be configured to be detachably couple with each zone of the plurality of zones 108 of the pair of longitudinal side rails 110. In some embodiments, the plurality of detachable conveyor sections 104 may be configured to be secured with each zone of the plurality of zones 108 of the pair of longitudinal side rails 110 through the plurality of fasteners 132. In some embodiments, each of the plurality of detachable conveyor sections 104 may comprise the pair of longitudinal side frames 122, the conveyor section drive pulley 128, and the at least one idler roller. In an example embodiment, each of the plurality of detachable conveyor sections 104 may further comprise at least one slider 1100. In some embodiments, the at least one slider 1100 may be configured to enable movement to the one or more objects placed over each of the plurality of detachable conveyor sections 104. In some embodiments, each of the plurality of detachable conveyor sections 104 may further comprise the pair of side covers 400. In some embodiments, the pair of side covers 400 may be configured to cover the second set of apertures 124 and the second cavity 126 of the pair of longitudinal side frames 122.

FIG. 12 illustrates a flowchart of a method 1200 for coupling of the detachable conveyor section with the conveyor frame of the conveyor system, in accordance with an example embodiment of the present disclosure.

At operation 1202, a conveyor section from of the plurality of detachable conveyor sections 104 may be placed over the conveyor frame 102 having the plurality of zones 108 and the pair of longitudinal side rails 110. Further, the pair of longitudinal side rails 110 may be configured to extend through at least one of the plurality of zones 108. Further, each zone of the conveyor frames 102 may be associated with a distinct detachable conveyor section of the plurality of detachable conveyor sections. Further, each zone of the conveyor frame 102 may comprise the power transmission assembly 106. Further, each longitudinal side rail of the pair of longitudinal side rails 110 may comprise the first set of apertures 118 and one of the pair of longitudinal side rails 110 may comprise the first cavity 120.

At operation 1204, each detachable conveyor section of the plurality of detachable conveyor sections 104 may be mounted to the pair of longitudinal side rails 110. Further, each detachable conveyor section may include the conveyor section drive pulley 128. Further, the power transmission assembly 106 for each detachable conveyor section of the plurality of detachable conveyor sections 104 may include the conveyor frame drive pulley 134, the idler pulley 136, the tensioner 138, and the conveyor section drive pulley 128 of the associated detachable conveyor section of the plurality of detachable conveyor sections 104. Further, the tensioner 138 may be configured to maintain the predefined tension of the drive belt 140 wrapped around the conveyor frame drive pulley 134, the idler pulley 136, the tensioner 138, and the conveyor section drive pulley 128 of the associated detachable conveyor section. Further, the tensioner 138 of each of the power transmission assembly 106 may be configured to release tension of an associated drive belt 140 for detaching an associated detachable conveyor section from the conveyor frame 102.

In an instance of re-attaching of the associated detachable conveyor section with the conveyor frame 102, the associated detachable conveyor section may be placed over the conveyor frame 102. Further, upon placement of the associated detachable conveyor section, the first set of apertures 118 of the pair of longitudinal side rails 110 of the conveyor frame 102 may get aligned with the second set of apertures 124 of the pair of longitudinal side frames 122. Further, the associated detachable conveyor section may be mounted to the pair of longitudinal side rails 110 of the conveyor frame 102 by fastening of the plurality of fasteners 132 with the first set of apertures 118 and the second set of apertures 124. Further, the screw with the independent component may facilitate the tensioner 138 of each of the power transmission assembly 106 to maintain tension of the associated drive belt 140.

FIG. 13 illustrates a flowchart of a method 1300 for decoupling of the detachable conveyor section from the conveyor frame of the conveyor system in accordance with an example embodiment of the present disclosure.

At operation 1302, the tensioner 138 of the power transmission assembly 106 may be configured to release the predefined threshold tension from of the associated drive belt for detaching the associated detachable conveyor section from the conveyor frame 102. Further, Further, the power transmission assembly 106 for each detachable conveyor section of the plurality of detachable conveyor sections 104 may include the conveyor frame drive pulley 134, the idler pulley 136, the tensioner 138, and the conveyor section drive pulley 128 of the associated detachable conveyor section of the plurality of detachable conveyor sections 104.

At operation 1304, each detachable conveyor section may be unmounted from the pair of longitudinal side rails 110 of the conveyor frame 102 by the plurality of fasteners 132. Further, the plurality of fasteners 132 may be unfastened from each of the detachable conveyor section and the pair of longitudinal side rails 110. Further, each of the pair of longitudinal side rails 110 may comprise the first set of apertures 118 and one of the pair of longitudinal side rails 110 may comprise the first cavity 120. Further, each of the detachable conveyor section may comprise the pair of longitudinal side frames 122 having the second set of apertures 124 and the second cavity 126.

At operation 1306, the at least one detached conveyor section may be lifted or slide from the conveyor frame 102 of the conveyor system 100. Further, the pair of longitudinal side rails 110 may comprise the at least one stud 300. Further, the at least one stud 300 may be configured to hold the drive belt 140 when each of the plurality of detachable conveyor sections 104 may be detached from the pair of longitudinal side rails 110 of the conveyor frame 102. In some alternative embodiments, the longitudinal side rails 110 may be fabricated with a tab (not shown) in a manner to allow to hold the drive belt 140.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A conveyor system comprising:

a conveyor frame and a plurality of detachable conveyor sections;

wherein the conveyor frame has a plurality of zones and a pair of longitudinal side rails extending through at least one of the plurality of zones;

wherein each zone of the conveyor frame is associated with a distinct detachable conveyor section of the plurality of detachable conveyor sections and includes a power transmission assembly;

wherein each detachable conveyor section is detachably mounted to the pair of longitudinal side rails via a plurality of fasteners and includes a conveyor section drive pulley;

wherein the power transmission assembly for each detachable conveyor section includes a conveyor frame drive pulley, an idler pulley, a tensioner, and a drive belt around the conveyor frame drive pulley, the idler pulley, the tensioner, and the conveyor section drive pulley of an associated detachable conveyor section;

wherein the tensioner of each power transmission assembly is configured to release tension of an associated drive belt for detaching the associated detachable conveyor section from the conveyor frame; and wherein the pair of longitudinal side rails further comprises at least one stud, wherein the at least one stud is configured to hold the drive belt when each of the plurality of detachable conveyor sections is detached from the pair of longitudinal side rails.

2. The conveyor system of claim 1, wherein each longitudinal side rail of the pair of longitudinal side rails comprises a first set of apertures and one of the pair of longitudinal side rails comprises a first cavity.

3. The conveyor system of claim 2, wherein each of the plurality of detachable conveyor sections further comprises a pair of longitudinal side frames for each zone, wherein the pair of longitudinal side frames comprise:

a second set of apertures fabricated on each longitudinal side frame of the pair of longitudinal side frames;

a second cavity fabricated at one of the pair of longitudinal side frames; and wherein the pair of longitudinal side frames is detachably coupled over the pair of longitudinal side rails with the first set of apertures aligned with the second set of apertures via the plurality of fasteners.

4. The conveyor system of claim 1, wherein the tensioner is configured to maintain a predefined tension of the drive belt wrapped around the conveyor frame drive pulley, the idler pulley, the tensioner, and the conveyor section drive pulley of the associated detachable conveyor section.

5. The conveyor system of claim 1, wherein the conveyor frame is rigidly mounted over a plurality of load supporting members.

6. The conveyor system of claim 1, wherein each of the plurality of detachable conveyor sections further comprises at least one conveyor belt, wherein one end of the at least one conveyor belt is coupled with the conveyor section drive pulley and other end of the at least one conveyor belt is coupled to an idler roller.

7. The conveyor system of claim 1, wherein the plurality of fasteners are released from the pair of longitudinal side rails and a pair of longitudinal side frames to detach each of the plurality of detachable conveyor sections from the pair of longitudinal side rails.

8. The conveyor system of claim 7, wherein upon detaching each of the plurality of detachable conveyor sections from the pair of longitudinal side rails, each of the plurality of detachable conveyor sections are configured to be removed by lifting and sliding each of the plurality of detachable conveyor sections.

9. The conveyor system of claim 1, wherein the tensioner comprises at least one lever, wherein the at least one lever is rotated in at least one direction to release a predefined tension over the drive belt and decouple each of the plurality of detachable conveyor sections from the pair of longitudinal side rails.

10. The conveyor system of claim 3, wherein the pair of longitudinal side frames further comprises a side cover, wherein the side cover is configured to cover the second set of apertures and the second cavity.

11. The conveyor system of claim 1, further comprising at least one photo-eye sensor mounted on a pair of longitudinal side frames of each of the plurality of detachable conveyer sections, wherein the at least one photo-eye sensor is configured to detect presence and precise positioning of one or more objects placed over each of the plurality of detachable conveyer sections.

12. A method comprising:

placing a conveyor section of a plurality of detachable conveyor sections over a conveyor frame having a plurality of zones and a pair of longitudinal side rails extending through at least one of the plurality of zones, wherein each zone of the conveyor frame is associated with a distinct detachable conveyor section of the plurality of detachable conveyor sections and includes a power transmission assembly;

mounting, via a plurality of fasteners, each detachable conveyor section to the pair of longitudinal side rails, wherein each detachable conveyor section includes a conveyor section drive pulley;

wherein the power transmission assembly for each detachable conveyor section includes a conveyor frame drive pulley, an idler pulley, a tensioner, and a drive belt around the conveyor frame drive pulley, the idler pulley, the tensioner, and the conveyor section drive pulley of an associated detachable conveyor section;

wherein the tensioner of each power transmission assembly is configured to release tension of an associated drive belt for detaching the associated detachable conveyor section from the conveyor frame; and wherein the pair of longitudinal side rails further comprises at least one stud, wherein the at least one stud is configured to hold the drive belt when each of the plurality of detachable conveyor sections is detached from the pair of longitudinal side rails.

13. The method of claim 12, wherein each longitudinal side rail of the pair of longitudinal side rails comprises a first set of apertures and one of the pair of longitudinal side rails comprises a first cavity.

14. The method of claim 13, wherein each of the plurality of detachable conveyor sections further comprises a pair of longitudinal side frames for each zone, wherein the pair of longitudinal side frames comprise:

a second set of apertures fabricated on each longitudinal side frame of the pair of longitudinal side frames;

a second cavity fabricated at one of the pair of longitudinal side frames; and wherein the pair of longitudinal side frames is detachably coupled over the pair of longitudinal side rails with the first set of apertures aligned with the second set of apertures via the plurality of fasteners.

15. The method of claim 12 further comprising maintaining via the tensioner, a predefined tension of the drive belt wrapped around the conveyor frame drive pulley, the idler pulley, the tensioner, and the conveyor section drive pulley of the associated detachable conveyor section.

16. The method of claim 12 further comprising rigidly mounting the conveyor frame over a plurality of load supporting members.

17. The method of claim 12, wherein each of the plurality of detachable conveyor sections further comprises at least one conveyor belt, wherein one end of the at least one conveyor belt is coupled with the conveyor section drive pulley and other end of the at least one conveyor belt is coupled to an idler roller.

18. The method of claim 12 further comprising releasing the plurality of fasteners from the pair of longitudinal side rails and a pair of longitudinal side frames to detach each of the plurality of detachable conveyor sections from the pair of longitudinal side rails.

* * * * *